(12) United States Patent
Chau

(10) Patent No.: US 7,474,773 B2
(45) Date of Patent: Jan. 6, 2009

(54) METHODS AND SYSTEMS FOR AUTOMATED FINGERPRINT RECOGNITION

(76) Inventor: Lam Ko Chau, 6066 Vineyard Dr., Ottawa, Ontario (CA) K1C 2M5

( * ) Notice: Subject to any disclaimer, the term of this patent is extended or adjusted under 35 U.S.C. 154(b) by 0 days.

(21) Appl. No.: 11/985,761

(22) Filed: Nov. 16, 2007

(65) Prior Publication Data

US 2008/0192994 A1   Aug. 14, 2008

Related U.S. Application Data

(63) Continuation of application No. 11/706,644, filed on Feb. 14, 2007, now Pat. No. 7,327,859.

(51) Int. Cl.
*G06K 9/00* (2006.01)
(52) U.S. Cl. .................... 382/124; 382/116; 382/284
(58) Field of Classification Search ......... 382/124–126, 382/116, 284; 283/68–70
See application file for complete search history.

(56) References Cited

U.S. PATENT DOCUMENTS

| | | | |
|---|---|---|---|
| 4,817,183 A | 3/1989 | Sparrow | |
| 5,796,857 A | 8/1998 | Hara | |
| 5,838,812 A | 11/1998 | Pare et al. | |
| 6,292,576 B1 * | 9/2001 | Brownlee | 382/124 |
| 6,320,177 B1 | 11/2001 | Sayag | |
| 6,327,376 B1 * | 12/2001 | Harkin | 382/124 |
| 6,381,347 B1 * | 4/2002 | Teng et al. | 382/127 |
| 6,483,932 B1 * | 11/2002 | Martinez et al. | 382/124 |
| 6,643,390 B1 * | 11/2003 | Clark et al. | 382/124 |
| 6,757,411 B2 | 6/2004 | Chau | |
| 6,795,569 B1 * | 9/2004 | Setlak | 382/124 |
| 6,898,299 B1 | 5/2005 | Brooks | |
| 7,199,863 B2 * | 4/2007 | Bruls et al. | 355/69 |
| 7,221,489 B2 | 5/2007 | Carver et al. | |

(Continued)

FOREIGN PATENT DOCUMENTS

WO   WO 03052675 A1 *   6/2003

(Continued)

OTHER PUBLICATIONS

Whitney, Hassler, *Geometric Integration Theory*, Princeton University Press, 1957, (a) pp. 348-353 and (b) 355-357.

(Continued)

*Primary Examiner*—Daniel G Mariam
(74) *Attorney, Agent, or Firm*—Klarquist Sparkman, LLP

(57) ABSTRACT

A method of identifying a donor of a fingerprint image exhibiting a pattern of minutiae. The method comprises deriving a donor index code and a donor match code associated with the donor fingerprint image. A database of records is accessed—each record being associated with an identity and indicative of a respective index code and a respective match code—in an attempt to identify at least one record for which the respective index code corresponds to the donor index code. Responsive to the attempt being successful, it is determined whether any of these "candidate" records includes a particular record for which the respective match code corresponds to the donor match code. Upon indeed determining that this is so for a particular record, an output is generated, such output being indicative of a conclusion that the donor of the fingerprint image has the identity associated with the particular record.

9 Claims, 10 Drawing Sheets

U.S. PATENT DOCUMENTS

| | | | | |
|---|---|---|---|---|
| 7,254,255 | B2* | 8/2007 | Dennis | 382/115 |
| 2002/0012455 | A1* | 1/2002 | Benckert | 382/124 |
| 2004/0028262 | A1* | 2/2004 | Lin et al. | 382/127 |
| 2004/0032581 | A1 | 2/2004 | Nikoonahad et al. | |
| 2005/0122508 | A1 | 6/2005 | Uto et al. | |
| 2005/0168729 | A1 | 8/2005 | Jung et al. | |
| 2006/0083408 | A1 | 4/2006 | Hoffman et al. | |
| 2006/0177106 | A1 | 8/2006 | Wrage | |

FOREIGN PATENT DOCUMENTS

WO  PCT/CA2008/000277     5/2008

OTHER PUBLICATIONS

Eells, James and Toledo, Domingo, Editors, *Hassler Whitney Collected Papers*, Birkhäuser Boston—Basel—Berlin, 1992, pp. 339-344.

Lee, Henry C. and Gaensslen, R.E., Editors, *Advances in Fingerprint Technology*, Second Edition, CRC Press, Boca Raton—London—New York—Washington, D.C., 2001, pp. 352-356, 362-363, 373-377.

Maltoni, Davide, et. al, *Handbook of Fingerprint Recognition*, Springer-Verlag, 2003, pp. 13-19.

"Basic properties of real functions," *Math Tutor Level 3*, http://math.feld.cvut.cz/mt/txtb/3/txe3ba3c.htm, visited Oct. 29, 2006, pp. 1-3.

\* cited by examiner

METHODS AND SYSTEMS FOR AUTOMATED FINGERPRINT RECOGNITION

CROSS REFERENCE TO RELATED APPLICATIONS

The present application is a continuation of U.S. patent application Ser. No. 11/706,644, filed on Feb. 14, 2007 (now U.S.Pat. No. 7,327,859), the contents of which are incorporated by reference herein.

FIELD OF THE INVENTION

The present invention relates generally to fingerprint recognition technology and, more specifically, to methods and systems for automated fingerprint recognition.

BACKGROUND OF THE INVENTION

The need to identify and authenticate individuals is greater today than it has ever been, and is particularly acute for applications such as homeland security, law enforcement, electronic commerce, access control and privacy protection, to name a few.

The use of biometrics in general, and fingerprint recognition in particular, to identify and authenticate humans is a proven method that dates back several centuries. However, to perform identification and authentication in many of the applications envisaged today, speed is of the essence. Thus, there is a need for automated (computer-assisted) fingerprint recognition, where delays due to human intervention are kept to a minimum or eliminated altogether, but without sacrificing accuracy.

While popular television shows and movies portray computer-assisted fingerprint recognition as a seemingly perfected technology, it is known in the biometrics community that serious impediments remain in at least two areas.

Firstly, conventional algorithms used by computers to conclude whether or not there is a "match" between a subject fingerprint image and a reference fingerprint image tend to fail to reach the correct conclusion in cases where the subject fingerprint image exhibits an unstable pattern of minutiae. Such instability arises largely due to the necessity of having a thin liquid layer on top of the fingertip (and, notably, within the valleys of the epidermis of the fingertip) to provide continuity for light wave propagation in so-called dark field image acquisition. Because liquid molecules trapped inside the valleys during the impression-taking process move in a dynamic fashion (e.g., due to blood flow under the skin and fluctuation in the applied pressure), there will result a significant difference in the minutia pattern under machine detection from one impression to the next, for the same finger. This instability renders the matching score achievable by conventional fingerprint recognition techniques low in comparison with certain other biometric technologies, such as iris scan, for example.

Secondly, recognizing that many fingerprint images available today for comparison were taken at some time in the past, it will be appreciated that such images cannot realistically be re-captured and re-entered into a database. Thus, depending on the conditions under which such "legacy" fingerprint images were taken, they may not be in an ideal coordinate system for reliable machine comparison relative to a subject fingerprint image. This again leads to the instability issue mentioned above as well as other problems.

Thus, there is a need in the fingerprint recognition art for a technological solution that overcomes at least in part the aforesaid deficiencies.

SUMMARY OF THE INVENTION

According to a first broad aspect, the present invention seeks to provide a method of populating a database for use in fingerprint recognition, comprising: acquiring a fingerprint image associated with a person of interest, the fingerprint image exhibiting a pattern of minutiae; deriving an index code associated with the fingerprint image; deriving a match code associated with the fingerprint image, the match code having greater information content than the index code; and storing the index code and the match code in the database in association with identity information regarding the person of interest.

According to a second broad aspect, the present invention seeks to provide a system for populating a database for use in fingerprint recognition, comprising: a fingerprint acquisition device configured to acquire a fingerprint image associated with a person of interest, the fingerprint image exhibiting a pattern of minutiae; and a processing entity configured to derive an index code associated with the fingerprint image; derive a match code associated with the fingerprint image, the match code having greater information content than the index code; and store the index code and the match code in the database in association with identity information regarding the person of interest.

According to a third broad aspect, the present invention seeks to provide a computer-readable medium comprising computer-readable program code which, when interpreted by a computing apparatus, causes the computing apparatus to execute a method of populating a database for use in fingerprint recognition. The computer-readable program code comprises first computer-readable program code for causing the computing apparatus to acquire a fingerprint image associated with a person of interest, the fingerprint image exhibiting a pattern of minutiae; second computer-readable program code for causing the computing apparatus to derive an index code associated with the fingerprint image; third computer-readable program code for causing the computing apparatus to derive a match code associated with the fingerprint image, the match code having greater information content than the index code; and fourth computer-readable program code for causing the computing apparatus to store the index code and the match code in the database in association with identity information regarding the person of interest.

According to a fourth broad aspect, the present invention seeks to provide a method of identifying a donor of a fingerprint image exhibiting a pattern of minutiae, comprising: deriving a donor index code associated with the donor fingerprint image; deriving a donor match code associated with the donor fingerprint image; accessing a database of records, each record being associated with an identity and being indicative of a respective index code and a respective match code, in an attempt to identify at least one of said records for which the respective index code corresponds to the donor index code; responsive to said attempt being successful: determining whether the at least one of said records includes a particular record for which the respective match code corresponds to the donor match code; and, upon determining that the at least one of said records includes a particular record for which the respective match code corresponds to the donor match code, generating an output indicative of a conclusion that the donor of the fingerprint image has the identity associated with the particular record.

According to a fifth broad aspect, the present invention seeks to provide a computer-readable medium comprising computer-readable program code which, when interpreted by a computing apparatus, causes the computing apparatus to execute a method of identifying a donor of a fingerprint image exhibiting a pattern of minutiae. The computer-readable program code comprises first computer-readable program code for causing the computing apparatus to derive a donor index code associated with the donor fingerprint image; second computer-readable program code for causing the computing apparatus to derive a donor match code associated with the donor fingerprint image; third computer-readable program code for causing the computing apparatus to access a database of records, each record being associated with an identity and being indicative of a respective index code and a respective match code, in an attempt to identify at least one of said records for which the respective index code corresponds to the donor index code; and fourth computer-readable program code for causing the computing apparatus to act in response to said attempt being successful, by (i) determining whether the at least one of said records includes a particular record for which the respective match code corresponds to the donor match code and, upon determining that the at least one of said records includes a particular record for which the respective match code corresponds to the donor match code, (ii) generating an output indicative of a conclusion that the donor of the fingerprint image has the identity associated with the particular record.

According to a sixth broad aspect, the present invention seeks to provide a method of authenticating a provider of a donor fingerprint image exhibiting a pattern of minutiae, comprising: obtaining information regarding an identity of the provider; deriving a donor index code from the donor fingerprint image; deriving a donor match code from the donor fingerprint image; accessing a database of records associated with respective identities to obtain therefrom a particular index code and a particular match code held in association with the identity of the provider; responsive to the donor index code not corresponding to the particular index code, generating an output indicative of a conclusion indicating that the provider is an impostor; and responsive to the donor index code corresponding to the particular index code, effecting a comparison between the donor match code and the particular match code to confirm whether the provider is genuine.

According to a seventh broad aspect, the present invention seeks to provide a computer-readable medium comprising computer-readable program code which, when interpreted by a computing apparatus, causes the computing apparatus to execute a method of authenticating a provider of a donor fingerprint image exhibiting a pattern of minutiae. The computer-readable program code comprises first computer-readable program code for causing the computing apparatus to obtain information regarding an identity of the provider; second computer-readable program code for causing the computing apparatus to derive a donor index code from the donor fingerprint image; third computer-readable program code for causing the computing apparatus to derive a donor match code from the donor fingerprint image; fourth computer-readable program code for causing the computing apparatus to access a database of records associated with respective identities to obtain therefrom a particular index code and a particular match code held in association with the identity of the provider; fifth computer-readable program code for causing the computing apparatus to act in response to the donor index code not corresponding to the particular index code, by generating an output indicative of a conclusion indicating that the provider is an impostor; and sixth computer-readable program code for causing the computing apparatus to act in response to the donor index code corresponding to the particular index code, by effecting a comparison between the donor match code and the particular match code to confirm whether the provider is genuine.

These and other aspects and features of the present invention will now become apparent to those of ordinary skill in the art upon review of the following description of specific embodiments of the invention in conjunction with the accompanying drawings.

DETAILED DESCRIPTION OF NON-LIMITING EMBODIMENTS

The fingerprint recognition process comprises two main phases, namely an enrollment phase and an active phase. During the enrollment phase, a database of records is populated with fingerprint data regarding a plurality of persons of interest, for eventual comparison with fingerprint data obtained from a subject during the active phase. Enrollment of persons of interest may be done by processing live-scan fingerprint images (obtained in situ) or by processing legacy fingerprint images, such as inked impressions, obtained previously.

Figure 2:
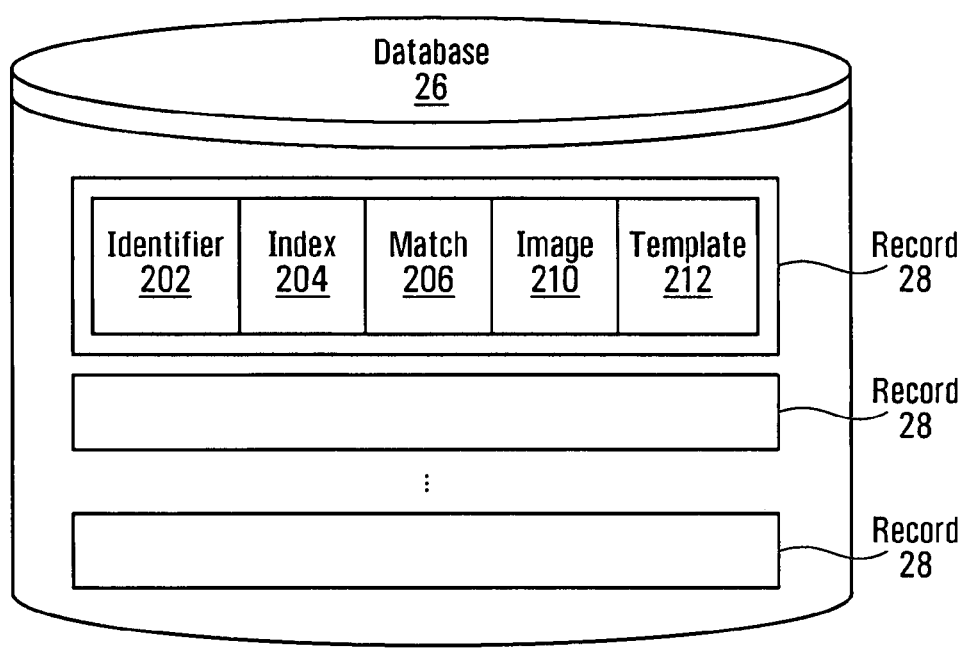
FIG. 2 illustrates the contents of a database used in a fingerprint recognition process in accordance with a specific non-limiting embodiment of the present invention.

With reference to FIG. 2, there is shown a database 26, which comprises a plurality of records 28. The database 26 may be centralized (as in a fingerprint repository) or distributed (as in a plurality of fingerprint scanners). For instance, where the application at hand involves attempting to determine a subject's presence on an international no-fly list, the database 26 may span the intelligence services of multiple countries. Alternatively, where the application at hand involves controlling a subject's access to resources of a company having a single geographic location, the database 26 may store data regarding a set of employees in a local manner, e.g., in a desktop, a laptop or a networked personal digital assistant implementing a fingerprint scanner. Still other configurations and implementations are possible without departing from the scope of the present invention.

The records 28 may be stored in the form of a table, list, or other data structure (or combination of data structures) known to those of skill in the art. As shown in FIG. 2, each of the records 28 comprises an identifier field 202, which stores a unique identifier associated with a person of interest. Thus, each of the records 28 in the database 26 is associated with a person of interest. The unique identifier stored in the identifier field 202 can take the form of a name, number, address, etc.

Each of the records 28 further comprises a respective index field 204 and a respective match field 206, which store, respectively, an "index code" and a "match code", both of which have been derived (in the manner to be described later) from a reference fingerprint image obtained from the person of interest associated with the unique identifier stored in the identifier field 202. The index code and the match code stored in the index field 204 and the match field 206, respectively, can take the form of a string expressed using numbers, characters, letters, symbols or any conceivable variant or combination thereof.

Although only one index code and one corresponding match code are shown as forming part of each record, it is within the scope of the present invention to provide multiple index codes and multiple corresponding match codes within a given record in order to represent, for example, multiple fingers or multiple impression-taking sessions for a given person of interest. Similarly, although only one record is shown as being associated with each person of interest, it is within the scope of the present invention to provide multiple records for a given person of interest to represent, for example, multiple fingers or multiple impression-taking sessions for the given person of interest.

Each of the records 28 may optionally comprise an image field 210, which can store the reference fingerprint image from which the respective index code and match code were derived (e.g., in a digital image file format such JPEG, bitmap or other compressed or uncompressed digital image file format, for example). In addition, each of the records 28 may optionally comprise a template field 212, which can store a template (i.e., a parametric representation) of the respective reference fingerprint image.

A description of how a reference fingerprint image can be obtained from a given person of interest during the enrollment phase is now provided. Specifically, an image acquisition device is used to obtain a live-scan image of a finger of a person of interest whose identity has been verified. The image acquisition device can be implemented using a variety of technologies, including optical, capacitive or ultrasonic sensors, for example, or combinations thereof.

Figure 1A:
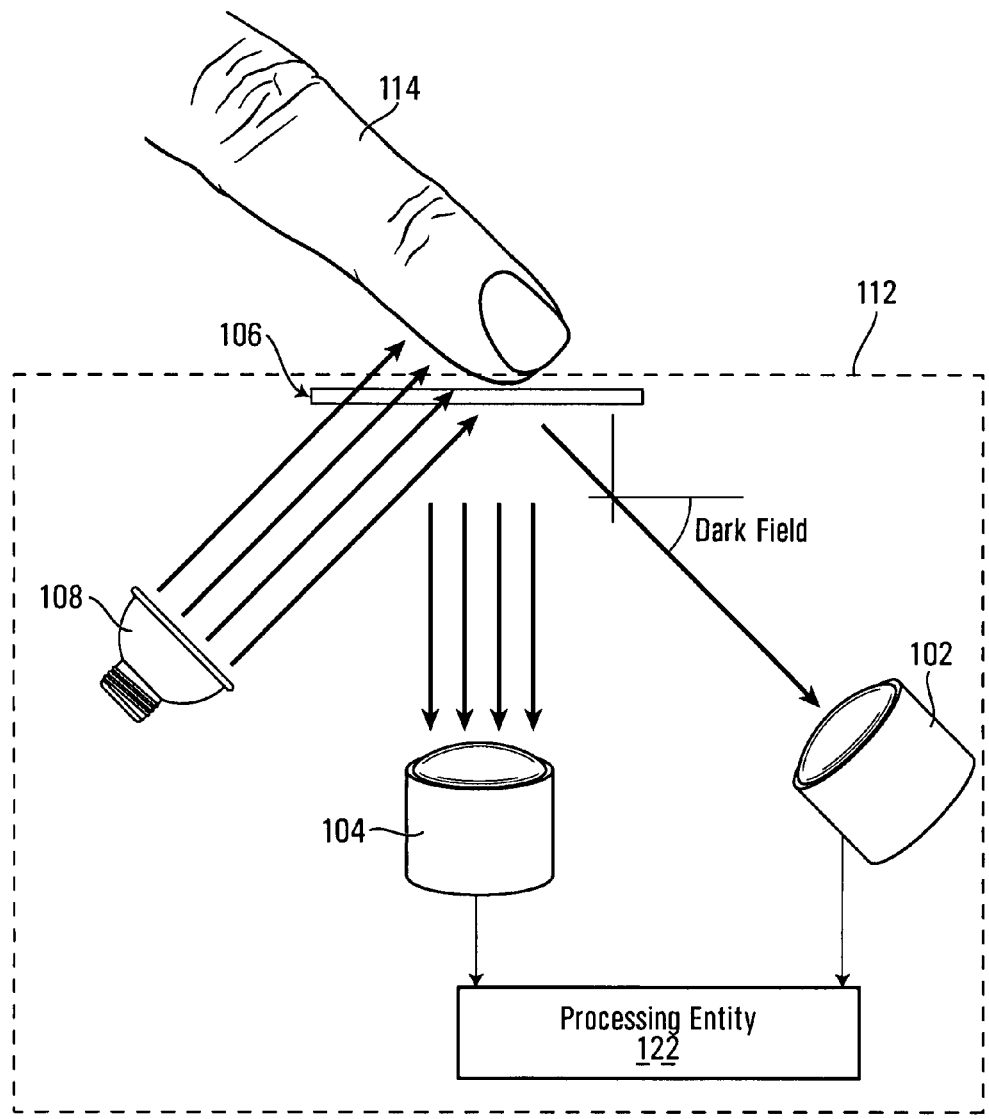
FIG. 1A depicts an image acquisition device for obtaining a live-scan image of a finger 114 of a person of interest, in accordance with a specific non-limiting embodiment of the present invention.

In the specific non-limiting embodiment illustrated in FIG. 1A, the image acquisition device 112 includes a dark field camera 102 in combination with a bright field camera 104. A finger 114 from a person of interest is placed onto a transparent contact area 106, which in a non-limiting embodiment can be a glass prism under frustrated total internal reflection, and a light source 108 shines light at an angle, from below the contact area 106. The light arriving obliquely from the light source 108 enters a thin liquid layer (natural or artificial) at the boundary between the contact area 106 and the finger 114 which partially fills the valleys between the ridges of the epidermis of the finger 114. In order to differentiate valleys from ridges, it is desirable for the image acquisition device 112 to preserve the valleys in the form of air pockets and the ridges in the form of absorbing material capable of causing random scattering of the incident light. Suppose now in FIG. 1A that there is a situation where the dark field camera 102 is placed at the "critical angle" with the finger 114 removed. Incident light at the critical angle to the contact area 106 from underneath will cause total internal reflection at the glass/air boundary according to Snell's law, provided that the boundary condition that a light wave be continuous across the interface is satisfied. The direction of light propagation is reversed with finger 114 being pressed on the surface of contact area 106. In other words, light waves will be reflected by the air pockets trapped in the valleys, and when they acquire an angle of incidence of 90 degrees to the normal line perpendicular to the boundary in a limiting case, these light waves will be refracted, first through the liquid layer and then the glass medium of the prism at exit angles of refraction (to the normal line) equal to or less than the critical angle. As a result, a certain field of view underneath the contact area 106 will remain dark above the critical angle, which is referred to as the "dark field", while at the edge of this dark field, reflected light will be visible below the critical angle. Since the refractive index of liquid is closer to that of glass than that of air, the function of the liquid layer is to serve as a 'filler' to equalize the uneven heights of the ridges in order to satisfy the continuity boundary condition for Snell's law to apply. If there is an air gap between the top of a short ridge and the liquid, the ridge will disappear ("dry finger" condition). On the other hand, if the liquid fills up a valley, the valley will disappear ("wet finger" condition). Therefore, fluctuation of the thickness of the liquid layer under such optical fingerprint impression taking is identified as the main source of instability for fingerprint minutiae detection. So far, the aspect of reflection caused by ridges has been ignored in the above description, because the amount of light wave energy captured by the dark field camera 102 from such off-ridge reflection has been found insignificant due to absorption and random scattering at the ridges. Upon capture by the dark field camera 102, this dark/light pattern will indicate the location of the valleys of the finger 114. The sought-after ridge pattern is obtained by inverting the valley pattern.

Meanwhile, the bright field camera 104 takes an image of the finger 114 from directly below the contact area 106 and in so doing captures a contour of the finger 114 and possibly also the first flexion crease of the finger 114. It is noted that the contour and the first flexion crease are features that are substantially invariant to conditions such as pressure and dryness of the finger 114, although both of these factors can affect the image captured by the dark field camera 102.

Figure 1B:
FIG. 1B illustrates a fingerprint image output by joint processing of the output of a bright field camera and a dark field camera used in the image acquisition device of FIG. 1A.

The output of the bright field camera 104 and the dark field camera 102 can be combined and jointly processed by a processing entity 122, which formulates a reference fingerprint image, an example of which is shown in FIG. 1B in magnified form. Specifically, the reference fingerprint image includes a ridge pattern 120 of the epidermis, as well as the aforesaid contour (denoted 110 in FIG. 1B) and the aforesaid first flexion crease (denoted 118 in FIG. 1B).

In an alternative embodiment of the present invention, the bright field camera 104 can be replaced by a 3-D surface profiler (not shown), which has the capability of resolving variations in depth at the surface of the epidermis, allowing it to reproduce a ridge pattern similar to that shown in FIG. 1B. Moreover, such a 3-D surface profiler may even output a measure of the depth at various points in the reference fingerprint image.

In some embodiments, it may be desirable to orient the finger 114 in such a way as to improve the alignment accuracy with which comparisons are made with an eventual subject fingerprint image during the active phase. To this end, and in a specific non-limiting example, it is within the scope of the present invention to derive a reference frame for the reference fingerprint image and to ensure that the reference frame is always in the same relative orientation to the reticle (or graticule) of the contact area 106. For example, the reference frame can be defined by an "x" axis formed by the first flexion crease 118 of the finger 114 and a "y" axis perpendicular to the "x" axis that intersects the "x" axis a certain number of millimeters to the left of a pre-determined line (e.g., a vertical line through the tip of the contour 110, having the greatest "y" distance from the "x" axis, or a vertical line bisecting the contour into two substantially equal left and right portions bounded by the contour 110 and the first flexion crease 118). When the "x" and "y" axes so defined are aligned with the left and bottom edges of the graticule (reticle) of the contact area 106, then the orientation of the finger 114 is declared acceptable for capture, otherwise the finger 114 needs to be realigned by the person of interest until alignment is obtained. A feedback mechanism (e.g., audio, visual, via a technician, or other) can be provided which allows the person of interest (or the technician) to gauge whether the finger 14 has been properly aligned.

In other embodiments, the reference fingerprint image will have been previously obtained by photographing an inked impression of the finger 114 (known as a legacy fingerprint image). If the first flexion crease 118 is visible in the image, and if the contour 110 can be estimated, then a certain amount of re-alignment of the reference fingerprint image may be possible prior to proceeding with the remainder of the enrollment process. However, if the first flexion crease 118 is not visible, then re-alignment may not be possible. In this scenario, additional processing will ultimately need to be effected during the active phase of the recognition process. Alternatively, the flexion crease 118 can be obtained by examining a "ten-print card" where plain impressions are taken with the four fingers pressed together side by side.

Figure 3:
FIG. 3 shows an example of a reference fingerprint image exhibiting a minutiae pattern.

As can be appreciated from FIG. 3, the reference fingerprint image (denoted by the numeral 302) exhibits a pattern of minutiae, which is a term used to describe ridge characteristic features of interest appearing in the reference fingerprint image 302. Each of the minutiae is classified as being of a certain "type", which may include (without limitation):

core;
delta;
bifurcation;
ridge ending;
island (including dot);
lake;
crossover;
spur;
double bifurcation;
trifurcation; and
scar.

Further details regarding the above classification scheme can be found by consulting "Advances in Fingerprint Technology", $2^{nd}$ edition, edited by Lee H. C. and Gaensslen R. E., CRC Press, New York, 2001, Chapter 9 by David A. Stoney, hereby incorporated by reference herein. Other classification schemes are of course possible without departing from the scope of the present invention. In what follows, minutiae that are classified as bifurcations or ridge endings are referred to as "fundamental" minutiae, while any other type of minutiae are referred to as "compound" minutiae, as they can be expressed as singularities or as compositions of the aforementioned fundamental minutiae.

In the specific non-limiting example of the reference fingerprint image 302, twelve (12) minutiae have been identified, and have been numbered, from left to right as follows: F1, F2, C3, C4, F5, C6, F7, C8, F9, F10, F11 and C12. The prefix "F" is used to denote a fundamental minutia, whereas the prefix "C" is used to denote a compound minutia. In the reference fingerprint image 302 illustrated in FIG. 3, minutiae F1, F2, F7, F10 and F11 are bifurcations, minutiae F5 and F9 are ridge endings, minutiae C3 and C6 are crossovers, minutia C4 is a delta, minutia C8 is a core and minutia C12 is a lake.

It should be understood that the reference fingerprint image 302 illustrated in FIG. 3 is being used merely as an example, and that other reference fingerprint images are highly likely be different from the one illustrated due to the fact that each human has a distinctive pattern of ridges and valleys on the epidermis of each of his fingers.

Those skilled in the art will appreciate that commonly available commercial or free software or hardware can be used to identify and classify individual minutiae in a fingerprint image such as the reference fingerprint image 302. A non-limiting example of such software is the NIST FINGERPRINT IMAGE SOFTWARE 2 (NFIS2), available from the National Institute of Standards and Technology, 100 Bureau Drive, Stop 8940, Gaithersburg, Md., 20899, USA. Other hardware and/or software will be known to those of skill in the art.

Those skilled in the art will also appreciate that depending on the conditions under which the reference fingerprint image 302 is acquired, the minutiae pattern that is discernible will vary. For example, movement of the liquid molecule in the interface between the finger 114 and the contact area 106 during dark field image acquisition will cause dynamic disappearance and appearance of minutiae under machine detection. In the case of inked impressions that are later digitized, the finger pressure during the impression and the amount of ink applied will also affect the minutiae pattern, possibly leading to an over-inked or under-inked condition.

It is therefore within the scope to apply measures that increase the stability (i.e., reduce the tendency to appear/reappear under different impression taking sessions) of the compound and fundamental minutiae in the reference fingerprint image 302. This includes, for example, the process of retaining only those minutiae that can be extracted from both the individual image produced by the dark field camera 102 and the individual image produced by the bright field camera 104 (or 3-D surface profiler). Alternatively or in addition, a set of fingerprint images can be taken in rapid sequence and either the best image or a combination (e.g., average) thereof can be retained as the reference fingerprint image 302. For example, the chosen image may be the one that best displays the delta. Alternatively or in addition, the image acquisition device 112 can provide instructions to the person of interest to orient the finger in a suitable way, e.g., by varying the pitch, roll and/or yaw of the finger 114 (and/or its Cartesian position of within the graticule of the contact area 106), thereby to increase the range of possible images among which the best or a combination will be retained as the reference fingerprint image 302. The instructions can be provided as real-time feedback based on current measures of the orientation of the finger 114.

Having obtained the reference fingerprint image 302 for the person of interest, and having identified the minutiae therein, the following presents a description of how a template, an index code and a match code are derived from the reference fingerprint image 302, for storage in a record of the database 26.

Figure 1C:
FIG. 1C shows measurement of an angle between a horizontal axis and a tangent to the curve of a ridge in the fingerprint image of FIG. 1B.

The template (or parametric representation) of the reference fingerprint image 302 is a collection of minutiae vectors, each of which pertains to a different one of the minutiae. A given minutia vector $m_i$ can take the form $m_i$=(type, $x_i$, $y_i$, $\theta_i$, D), where type is the minutia type (ridge ending, bifurcation, etc.); $x_i$ and $y_i$ are the x- and y-coordinates of the location of the minutia within the reference frame, respectively; $\theta_i$ is the angle (with respect to an axis of the reference frame) of a tangent to the curve at the minutia location (see FIG. 1C for an example). In addition, and optionally, D is an average depth of the valleys around the minutiae point, which can be measured using a 3-D surface profiler.

The resultant template can be stored in the template field 212 of the particular one of the records 28 associated with the person of interest. In addition, or instead, the reference fingerprint image 302 can itself be stored in the image field 210 of the particular one of the records 28 associated with the person of interest.

The index code derived from the reference fingerprint image 302 is intended to allow, during the active phase of the recognition process, a quick comparison with a similar index code derived from a subject fingerprint image, thereby to allow a fast determination of whether or not there is a likelihood that there is a match between the provider of the subject fingerprint image and the person of interest associated with the reference fingerprint image 302.

Figure 4A:
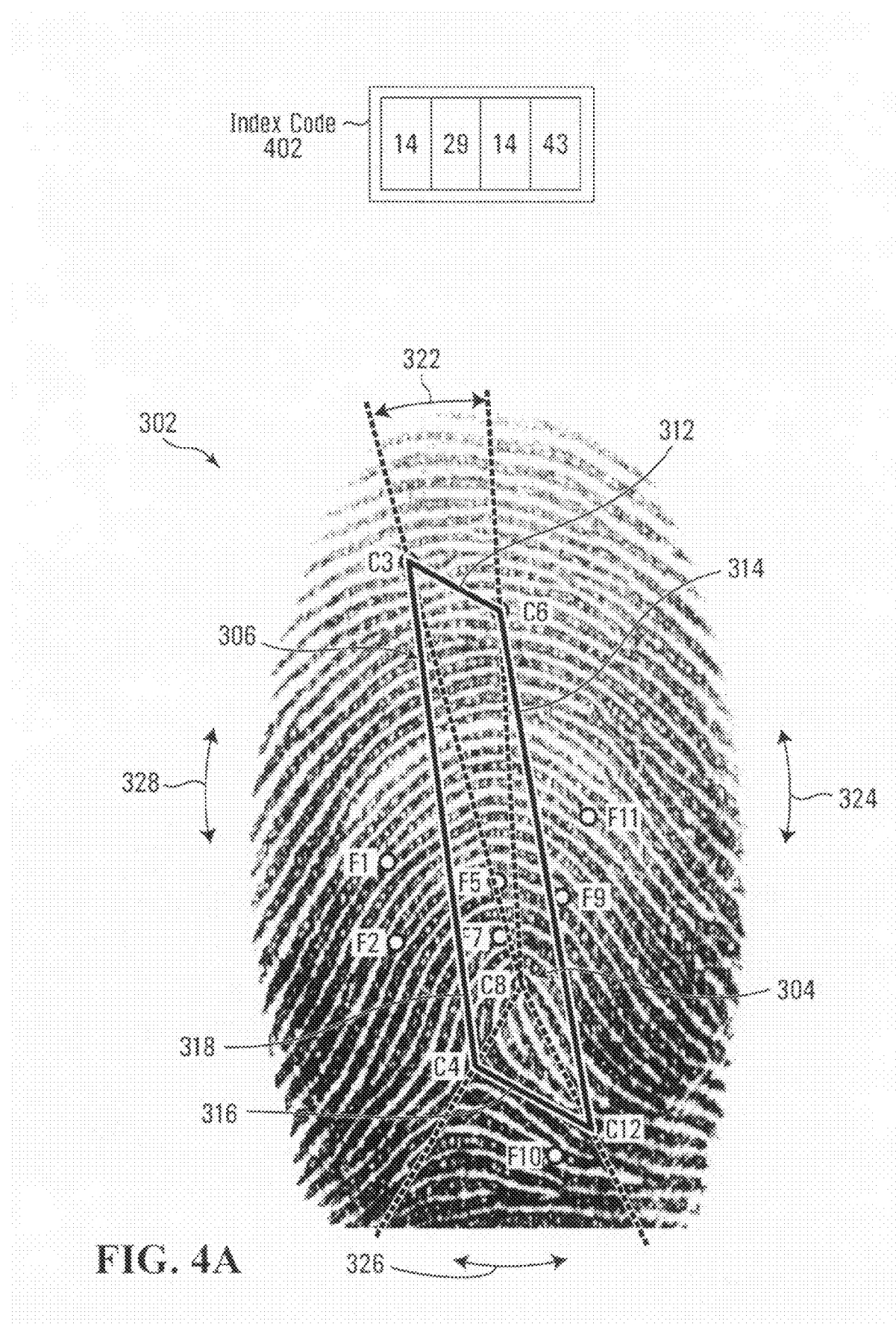
FIG. 4A shows derivation of an index code from the fingerprint image of FIG. 3 in accordance with a specific non-limiting embodiment of the present invention.

Accordingly, with reference to FIG. 4A, the derivation of an index code 402 from the reference fingerprint image 302 begins with selection of a reference minutia 304 and identification of the compound minutiae, namely C3, C4, C6, C8 and C12. In a specific non-limiting example, the reference minutia can be selected to be one of the compound minutiae and, more particularly, one of the compound minutiae of a type of which precisely one minutia is typically found. An example of a minutia type expected to meet this criterion is the core (in this case, minutia C8), although this need not be the case in every embodiment of the present invention. In any event, after selection of the reference minutia 304 as the core (C8) and identification of the other compound minutiae C3, C4, C6 and C12, one can designate these other compound minutiae as vertices of a polygon 306. Adjacent vertices are joined to create edges 312, 314, 316, 318 of the polygon 306 surrounding the reference minutia 304.

Those skilled in the art will appreciate that certain reference fingerprint images may include only one compound minutia other than the core. If this is the case, then the resultant polygon would become a single point and it is within the scope of the present invention to designate at least one of the fundamental minutiae as a virtual compound minutia. For example, the extreme leftmost fundamental minutia can be designated as a virtual compound minutia. Of course, the rule used to decide which fundamental minutia to designate as a virtual compound minutia is flexible.

Those skilled in the art will also appreciate that certain reference fingerprint images may not comprise any compound minutiae other than the core. If this is the case, then it is within the scope of the present invention to designate at least two of the fundamental minutiae as virtual compound minutiae. For example, the two leftmost fundamental minutiae can be designated as virtual compound minutiae. Of course, the number of virtual compound minutiae that can be designated is not limited by the present invention, and neither is the rule used to decide which fundamental minutiae to designate as virtual compound minutiae.

Those skilled in the art will further appreciate that certain reference fingerprint images may comprise more than one core. This can appear to present a difficulty when selecting a reference minutia. In these cases, it is within the scope of the present invention to apply a rule that results in the selection of only one of the cores as the one for the purposes of constructing a polygon. For example, this may be the core that "points" most upwards. In another example, this may be the core that "points" most downwards. Of course, the rule used to decide which core to select as the reference minutia is flexible and not particularly limited. The core(s) not selected as the reference minutiae can be considered as "ordinary" compound minutiae and thus can still figure in the construction of the polygon.

Having constructed a polygon as described above, beams having a finite width are drawn from each of the compound minutiae to the reference minutia (or, equivalently, from the reference minutia to each of the compound minutiae). This will result in the creation of sectors defined by the angular positions of the compound minutiae relative to the reference minutia. In the specific example of FIG. 4A, there are four compound minutiae C3, C4, C6 and C12 surrounding the reference minutia 304, leading to the creation of four (4) sectors denoted 322, 324, 326 and 328.

Next, each sector's "minutiae load" is recorded. More specifically, the fundamental minutiae in each of the sectors 322, 324, 326, 328 are counted, and a minutiae load within each sector is noted, e.g., by absolute number of fundamental minutiae or share/percentage of total fundamental minutiae. In the specific example of FIG. 4A, there is a total of seven fundamental minutiae F1, F2, F5, F7, F9, F10, F11 that are divided amongst the four sectors 322, 324, 326, 328. Specifically, sector 322 includes one fundamental minutia (namely, F5); sector 324 includes two fundamental minutiae (namely, F9, F11); sector 326 includes one fundamental minutia (namely, F10); and sector 328 includes three fundamental minutiae (namely, F1, F2, F7).

Thus, when the distribution of fundamental minutiae is expressed in terms of absolute number, this distribution amongst the four sectors 322, 324, 326, 328 is therefore, respectively, 1, 2, 1, 3. On the other hand, when the per-sector minutiae load is expressed as a percentage of the fundamental minutiae, this distribution amongst the four sectors 322, 324, 326, 328 is therefore, respectively, 14, 29, 14, 43 (rounded to the nearest percentage point), corresponding to $\frac{1}{7}$, $\frac{2}{7}$, $\frac{1}{7}$, $\frac{3}{7}$, respectively, recalling that the total number of fundamental minutiae is seven (7).

Next, the distribution recorded in the previous step is ordered, starting with a designated first sector selected according to a certain rule. In accordance with a specific non-limiting embodiment of the present invention, the designated first sector will have an easily and consistently identifiable feature, such as, for example, the extreme upper, lower, leftmost or rightmost fundamental or compound minutia (with respect to the reference frame). In other embodiments, the designated first sector can be the largest sector, or the smallest sector, or the one that includes the most or the least number of fundamental minutiae.

Continuing to refer to FIG. 4A, and in the specific case where the designated first sector is the one that includes the extreme upper compound minutia (in this case, C3), the designated first sector will be sector 322. The number of fundamental minutiae associated with this sector is 1 and the corresponding percentage is 14. The designated next, i.e., second, sector can be the neighbouring sector in either the clockwise or counter-clockwise direction. If it is the clockwise direction, then the designated second sector would be sector 324. The number of fundamental minutiae associated with this sector is 2 and the corresponding percentage is 29. Continuing with the clockwise direction of rotation, the designated next, i.e., third, sector would be sector 326. The number of fundamental minutiae associated with this sector is 1 and the corresponding percentage is 14. Finally, the designated fourth sector would be sector 328. The number of fundamental minutiae associated with this sector is 3 and the corresponding percentage is 43.

The index code 402 can then be created as a concatenation of the four percentages in the above order, namely 14 29 14 43. Of course, it should be understood that the manner of expressing the index code 402, as well as the manner of ordering the sectors 322, 324, 326, 328, and the manner in which the minutiae load within the sectors 322, 324, 326, 328 is measured (e.g., as a percentage, fraction, absolute number, etc. of the fundamental minutiae) are all characteristics that can be varied without departing from the scope of the present invention. However, once a selection is made regarding the parameters (e.g., ordering, measurement, etc.) applied in the generation of the index code 402, it would be advantageous to maintain these parameters consistent throughout the enrollment process.

Persons skilled in the art will appreciate that a beam of finite width emanating from the reference minutia 304 may capture a cluster of more than one compound minutia. In such cases where such a cluster of compound minutiae appears at substantially the same angular position around the reference minutia 304, it is within the scope of the present invention to select only one of the compound minutiae in this cluster for the purposes of constructing the polygon 306. For example, this can be the compound minutia in the cluster which is closest to the reference minutia 304. Alternatively, this can be the compound minutia in the cluster which is farthest from the reference minutia 304.

It should further be appreciated that the index code 402 can also be supplemented with additional information, which can include one or more of: the number of minutiae of a certain type (e.g., core, delta), the number of minutiae of all types, the number of fundamental minutiae, the number of compound minutiae, the number of sectors, etc. In the specific case where the index code is preceded by data indicative of (i) the number of minutiae that are categorized as a core (in this case, 1); (ii) the number of minutiae that are categorized as a delta (in this case, 1) and (iii) the total number of compound minutiae (in this case, 5), it will be apparent that in the illustrated embodiment, the index code 102 could be expressed as a concatenation of values as follows (with brackets being used simply to illustrate different information elements):

[1] [1] [05] [14] [29] [14] [43].

This concatenation of values can be expressed as a single string or in a variety of alternative formats without departing from the scope of the present invention. For instance, the index code 402 can be expressed in binary-coded decimal format for each digit (i.e., binary-coded decimal of 1 1 0 5 1 4 2 9 1 4 4 3), which is 0001 0001 0000 0101 0001 0100 0010 1001 0001 0100 0100 0011. Thus, a total of only six (6) bytes will be required to express the index code 402. In another non-limiting embodiment, the index code 402 can be expressed as the binary equivalent of the decimal number 14291443. Still other formats and encoding schemes are within the scope of the present invention.

It should also be appreciated that the index code 402 is relatively short and less unstable compared with a template (i.e., parametric representation). The reasoning is that the core, the delta and other compound minutiae all have low uncertainty for error in machine recognition. Fundamental minutiae on the other hand appear more often as a 'miss' or a 'false target' under dark-field image acquisition. Also, depending on the total number of fundamental minutiae, the percentage change is less unstable than the absolute change, since all changes occur in the same positive or negative direction in both the numerator and the denominator. Additional improvement in feature extraction stability should in principle render a higher matching score between reference and subject over time, thereby lowering the false rejection rate without incurring a higher false acceptance rate.

Therefore, the stability of the index code 402 for a given person of interest advantageously allows the rapid determination, during the active phase of the recognition process, of whether or not there is a even a chance of there being a match between a subject and the person of interest. In other words, the absence of a "match" between the index codes (without implying that matching index codes must be identical) instantly reflects a "no match" condition between the subject and the person of interest, without having to go through a derivation/comparison of match codes. A more detailed discussion of what qualifies as a "match" between two index codes is provided later on in this specification.

For its part, the match code derived from the reference fingerprint image 302 is intended to allow a positive determination of whether or not a subject fingerprint image submitted during the active phase of the recognition process was provided by the person of interest associated with the reference fingerprint image 302.

Figure 4B:
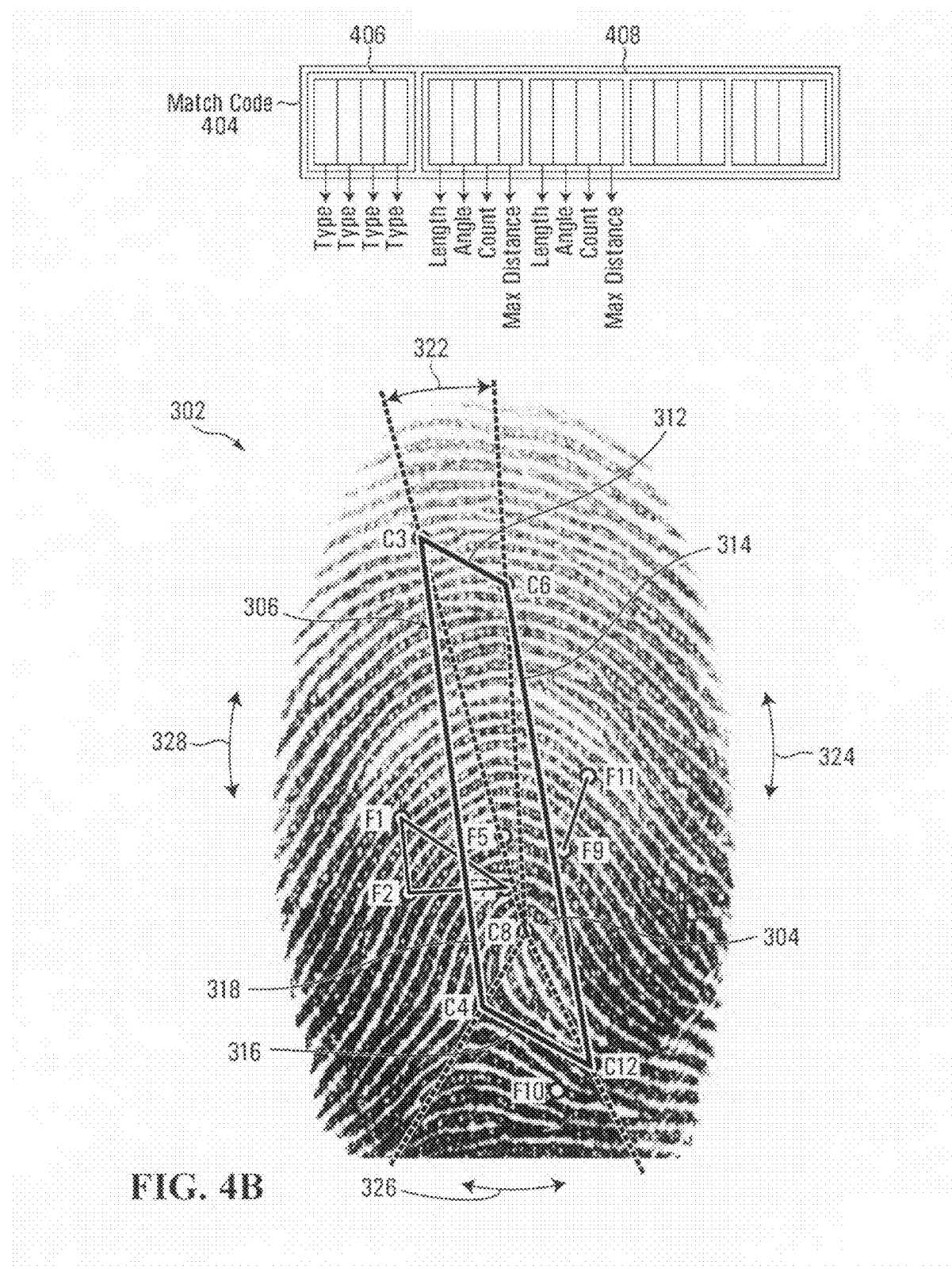
FIG. 4B shows derivation of a match code from the fingerprint image of FIG. 3 in accordance with a specific non-limiting embodiment of the present invention.

With reference to FIG. 4B, the derivation of a match code 404 from the reference fingerprint image 302 begins with the previously mentioned polygon 306 of compound minutiae surrounding the reference minutia 304. Specifically, the match code 404 comprises a first portion 406 and a second portion 408. The first portion 406 includes an ordered sequence of minutia type indicators, each minutia type indicator specifying the minutia type of one of the compound minutiae that is a vertex of the polygon 306. For the sake of illustration, the various minutia types may be associated with single-letter minutia type indicators in the following way using letters of the alphabet:

core: C;
delta: D;
island: R;
lake: L;
crossover: H;
spur: Y;
double bifurcation: W;
trifurcation: T;
scar: S.

Of course, one can utilize a different association between the various minutia types and corresponding minutia type indicators without departing from the scope of the present invention. For example, variants utilizing binary codes are possible, and in no way should the above example be considered limiting.

The ordering of the minutia type indicators within the first portion 406 of the match code 404 may begin with the minutia type indicator associated with an easily and consistently identifiable vertex of the polygon 306, e.g., the extreme upper, lower, leftmost or rightmost vertex (relative to the reference frame). The next minutia type indicator may be the one associated with the compound minutia forming a neighbouring vertex of the polygon 306 in either a clockwise or counter-clockwise direction around the reference minutia 304 (which in the present non-limiting example is the core C8). This process continues until the all the compound minutiae forming vertices of the polygon 306 have been accounted for. Thus, it will be noted that the ordering of the minutia type indicators can be the same the ordering of the sectors for the purposes of constructing the index code, although this need not be the case in every embodiment of the present invention.

In the specific example of the reference fingerprint image FIG. 4B, it is apparent that the extreme upper compound minutia forming a vertex of the polygon 306, namely C3, is a crossover (and therefore denoted by the minutia type indicator H). The compound minutia forming a neighbouring vertex of the polygon 306 in a clockwise direction, namely C6, is also a crossover (and therefore also denoted by the minutia type indicator H). The next compound minutia, namely C12, is a lake (denoted by the minutia type indicator L). The next and final compound minutia, namely C4, is a delta (denoted by the minutia type indicator D). The four minutia indicators can be concatenated to yield the string "HHLD" as the first portion 406 of the match code 404.

Those skilled in the art will appreciate that more than one compound minutia may reside at the same angular distance relative to a given compound minutia (i.e., when a beam of finite width emanating from the reference minutia 304 captures more than one compound minutia). As described earlier, it is within the scope of the present invention to use only one of the compound minutiae in this cluster as a vertex of the polygon 306. Nevertheless, the remaining compound minutiae in the cluster, although not accounted for in the aforementioned index code, can be accounted for in the first portion 406 of the match code 404.

For example, consider the situation where a beam emanating from the reference minutia 304 towards the extreme upper compound minutia, namely C3, captured a trifurcation (denoted by the minutia type indicator T) that is located further from the reference minutia than C3. In this case, the first portion 406 of the match code 404 may be expressed as HT/HLD, where the suffix "/" denotes a separation between a cluster of compound minutiae associated with a vertex of the polygon 306 and a neighbouring vertex (or another cluster) of the polygon 306. Of course, numerous other schemes for encoding the members of a cluster of compound minutiae associated with a vertex of the polygon 306 are within the scope of the present invention.

Derivation of the second portion 408 of the match code 404 is now described. The second portion 408 of the match code 404 comprises a data element for each edge 312, 314, 316, 318 of the polygon 306 emanating (in a clockwise or counter-clockwise direction) from a corresponding one of the vertices encoded in the first portion 406 of the match code 404. The data element for a given edge of the polygon 306 encodes features of the compound minutiae forming the given edge as well as features of the fundamental minutiae within the sector containing the given edge.

For example, consider the case of a given edge of the polygon (e.g., any of edges 312, 314, 316, 318), which emanates from a first hypothetical compound minutia in a clockwise direction towards a second hypothetical compound minutia. A feature of the hypothetical compound minutiae forming the given edge could include the length of the given edge (e.g., expressed in mils, millimeters, tenths of a millimeter, pixels, etc.). Another feature of the hypothetical compound minutiae forming the given edge could be an angle (relative to the horizontal of the image frame) of the tangent to the curve at either the first hypothetical compound minutia or the second hypothetical compound minutia (e.g., expressed in degrees, tens of degrees, radians, etc.). Still other features of the compound minutiae forming the given edge are within the scope of the present invention.

A feature of the fundamental minutiae within the sector containing the given edge could be the number of fundamental minutiae within that sector. Another feature of the fundamental minutiae within the sector containing the given edge could be the greatest distance (e.g., expressed in mils, millimeters, tenths of a millimeter, pixels, etc.) between any pair of those fundamental minutiae. Still other features of the fundamental minutiae within the sector containing the given edge are within the scope of the present invention.

In the specific example of FIG. 4B, it is noticed that the edge emanating from compound minutia C3 in a clockwise direction around the reference minutia 304 (in this case, the core—C8) is edge 312. The length of edge 312 is twenty-three (23) tenths of a millimeter (i.e., 2.3 mm), the angle (relative to the horizontal of the reference frame in the counter-clockwise direction) of the tangent to the curve at compound minutia C3 is four (4) tens of degrees (i.e., 40 degrees), the number of fundamental minutiae in sector 322 that includes edge 312 is one (1) and, since there is only one such fundamental minutia, there is no distance to be measured between any pair of such fundamental minutiae within this sector. Therefore, the relevant values for the first data element of the second portion 408 of the match code 404 (i.e., corresponding to the crossover compound minutia C3, expressed in the first portion 406 of the match code 404 as "H") are 23, 4, 1 and 0 which can be expressed as three-digit numbers and concatenated, to yield 023 004 001 000.

A similar approach can be applied to the derivation of the second, third and fourth data elements of the second portion 408 of the match code 404 (corresponding to compound minutiae C6, C12 and C4, expressed in the first portion 406 of the match code 404 as "HLD"), yielding 116 007 002 019, 029 000 001 000 and 112 035 003 030, respectively. Thus, the match code 404 in its entirety may be expressed as follows:

HHLD023004001000116007002019029000001000112035003030.

The four letters in the above match code 404 (i.e., the first portion 406 of the match code 404) represent the four compound minutiae, which are the vertices of the polygon 306 in a sequence starting from the north-most direction along a clockwise rotation about the core C8 (or virtual core in the case of an "arch" fingerprint pattern that lacks a core). The first portion 406 would be 4 bytes long at one byte per letter (ASCII), and is followed by the second portion 408 that contains four (4) numeric fields, for each of the four (4) sectors. One non-limiting choice of units ensures that each of the numeric fields contains a value that can be represented by a three-digit number confined to a single byte in length (0 to 255 levels). Therefore, the total length of the match code 404 in this example is 4+(4*4)=20 bytes long.

Of course, it should be understood that the manner of expressing the match code 404, as well as the manner of ordering the data elements within the second portion 408 of the match code 404, the ordering of the feature measurements within these data elements, and the units used for the purposes of measurement are all characteristics that can be varied without departing from the scope of the present invention. However, once a selection is made regarding the parameters (e.g., units, ordering, features, etc.) applied in the generation of the match code 404, it would be advantageous to maintain these parameters consistent throughout the enrollment process.

From the above, it will be appreciated that the probability that two or more of the records 28 in the database 26 will share the same index code is greater than the probability that two or more of the records 28 will share the same match code, i.e., the index code is "less unique" than the match code. This is due in part to the fact that a greater number of bits is required to express the match code than to express an index code. In this sense, it can be said that the match code has greater information content than the index code, which can be particularly useful for an identification process, where a large number of records may potentially need to be searched, and where the index code can be used to reduce the size of the search space.

Figure 5:
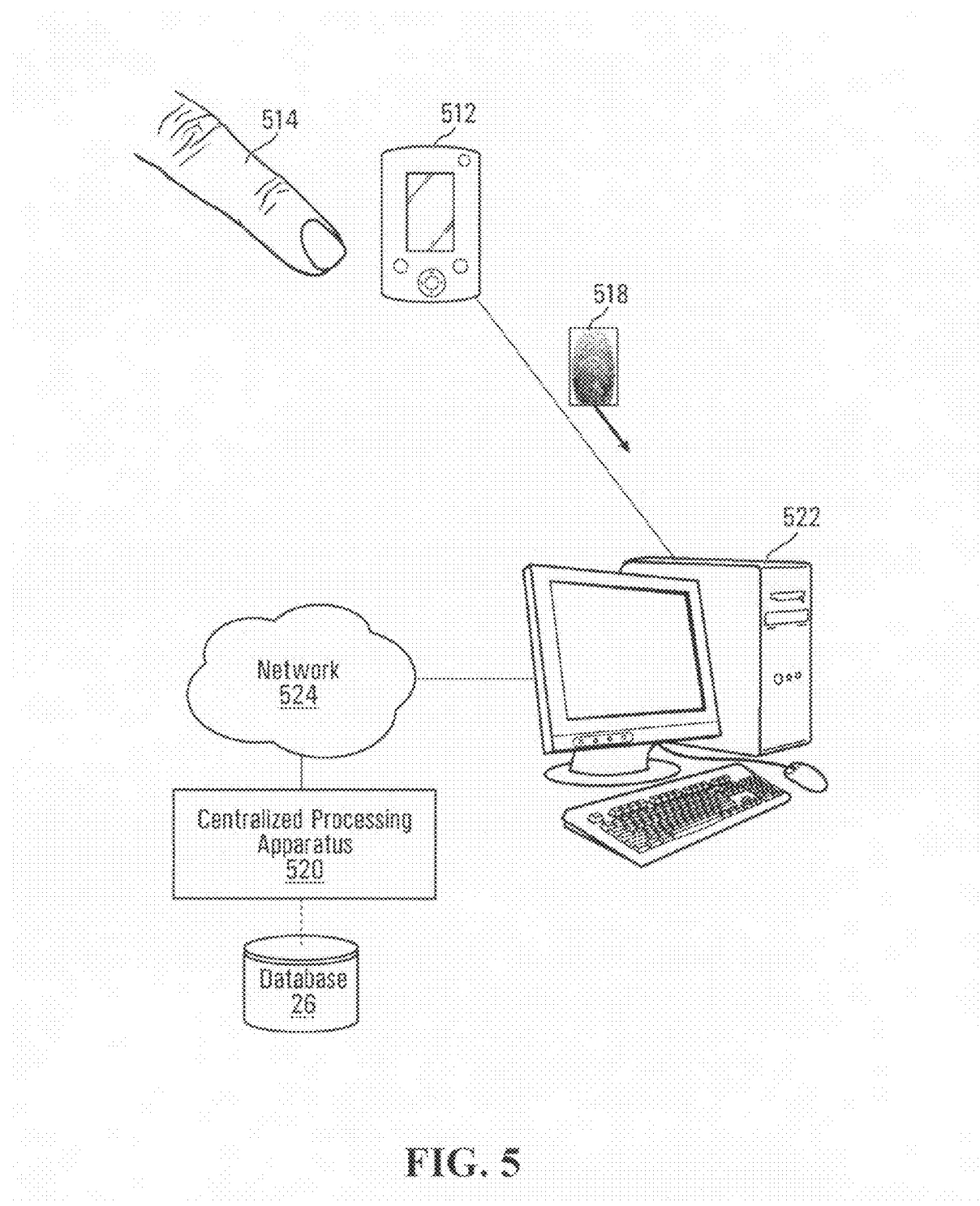
FIG. 5 shows a system for acquiring and processing a fingerprint image in accordance with a specific non-limiting embodiment of the present invention.

A system for use during the active phase of the recognition process is now described with reference to FIG. 5. The system comprises an image acquisition device 512 for acquiring a live-scan image of a subject finger 514 presented by an individual (hereinafter referred to as a "subject") being identified or authenticated. The live-scan image is hereinafter referred to as a "subject fingerprint image" 518.

The image acquisition device 512 may be the same as, or different from, the image acquisition device 112 described earlier in the context of the enrollment phase. In some embodiments, it may be desirable to orient the subject finger 514 in such a way as to improve the accuracy or speed with which comparisons are made with the reference fingerprint images in the database 26. To this end, and in a specific non-limiting example, it is within the scope of the present invention to derive a reference frame for the subject fingerprint image 518 and to ensure that the reference frame is in the same relative orientation as was the reference frame for the reference fingerprint image 302 described earlier. A feedback mechanism (e.g., audio, visual, via a technician, or other) can be provided which allows the subject (or the technician) to gauge whether the subject finger 514 has been properly oriented in terms of pitch, yaw or roll of the subject finger 514, or in terms of its Cartesian position within the graticule of the contact area of the image acquisition device 512 when the latter is implemented as a 2-D scanner.

The image acquisition device 512 may have a degree of portability that ranges from high (e.g., a hand-held device) to low (e.g., an automated teller machine—ATM). The image acquisition device 512 is communicatively coupled to a processing apparatus 520 where the subject fingerprint image 518 is processed in a manner that depends on the application at hand (namely, identification or authentication).

In some embodiments, the image acquisition device 512 can be directly connected to the processing apparatus 520 via a wireless, wired or optical link. In other embodiments, the image acquisition device 512 and the processing apparatus 520 can be networked computing devices connected to one another over a network, which can be a public network (such as the Internet), a private network or a combination thereof. In yet other embodiments, and as specifically illustrated in FIG. 5, the image acquisition device 512 can be connected to a local computing device 522 via a wireless, wired or optical link, and the local computing device 522 can be connected to the processing apparatus 520 over a network 524. Still other configurations are possible without departing from the scope of the present invention.

Figure 6:
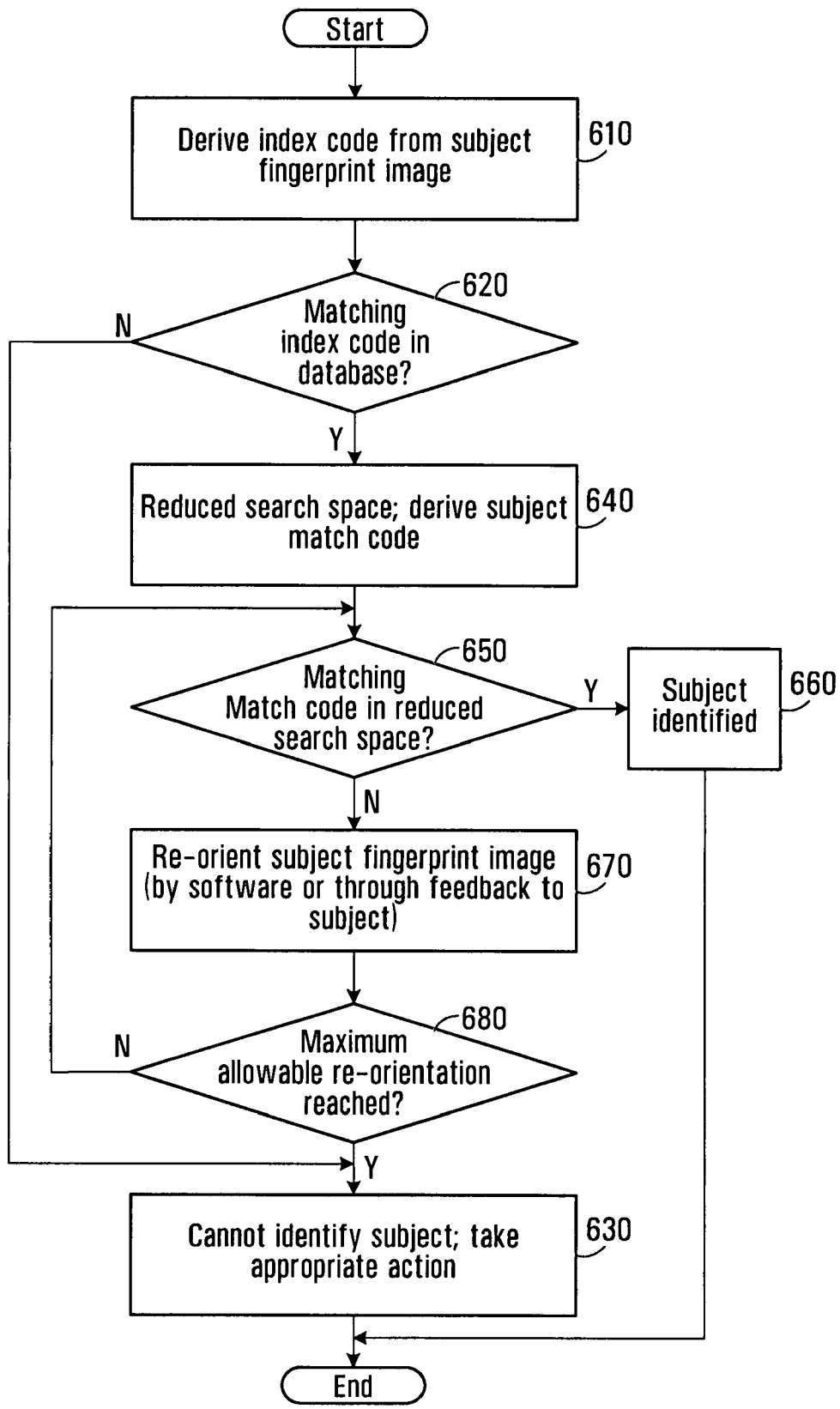
FIG. 6 is a flowchart showing steps in an identification process in accordance with a specific non-limiting embodiment of the present invention.

The processing apparatus 520 has access to the aforementioned database 26, either directly or over the network 524 or over a different network (not shown). In a first implementation, the processing apparatus 520 comprises suitable circuitry, software, firmware and/or control logic for executing an identification process. By executing the identification process, the processing apparatus 520 attempts to determine whether the subject has an identity that corresponds to the identity of any of the persons of interest associated with the records 28 in the database 26. This is achieved in accordance with the following steps, described with reference to FIG. 6.

Of course, it should be appreciated that the identification process can be executed partly or fully by the image acquisition device 512, which will be particularly true where the image acquisition device 512 is integrated with the central processing apparatus 520.

Step 610

The processing apparatus 520 derives a subject index code from the subject fingerprint image 518 in substantially the same manner as has been described above.

Step 620

The processing apparatus 520 determines whether any of the records 28 in the database 26 comprises an index field 202 containing an index code that matches the subject index code. If the answer is NO, the next step is step 630; if the answer is YES, the next step is step 640.

Specifically, in this step, the condition that one index code "match" another does not require that the index codes be identical, although if they are, a match will certainly be declared. Rather, a NO conclusion is reached under a "no match" condition, and a YES conclusion is reached otherwise. For instance, due to the underlying relative stability of the compound minutiae in a given fingerprint image, it is expected that the match codes derived from two fingerprint images originating from the same finger will indeed exhibit the same number of cores, the same number of deltas and the same number of other compound minutiae (i.e., thereby setting the total number of sectors). Therefore, portions of the index code specific to the core and delta should be identical; if they are not, a "no match" condition is reached and the outcome of step 620 is NO; otherwise, the outcome can be YES or a more stringent criterion may be considered. An example of a more stringent criterion is that the number of sectors should be identical; if they are not, a "no match" condition is reached and the outcome of step 620 is NO; otherwise, the outcome can be YES or an even more stringent criterion may be considered. An even more stringent criterion can be based on the fundamental minutiae. For instance, although their number and percentage may fluctuate, one nevertheless expects that the sectors containing the most and least numbers of fundamental minutiae will occur in the same positions in the two index codes being compared. This can be extended to a rank ordering of the positions of the sectors, based on minutiae load (e.g., number of fundamental minutiae or relative number, share or percentage of total fundamental minutiae). Still other methodologies and criteria for striking the appropriate threshold for concluding that there is a "no match" condition are possible without departing from the scope of the present invention.

Step 630

The processing apparatus 520 concludes that the subject cannot be identified. In other words, the identity of the subject is unknown, and action can be taken depending on the application, such as denial of access or a request for further credentials.

Step 640

The processing apparatus 520 concludes that it may be possible to identify the subject because there is a subset of at least one record in the database 26 for which the contents of the index field matches the subject index code (i.e., for which a "no match" condition has not been met). This subset of records can be referred to as the search space. At this stage, the processing apparatus 520 derives a subject match code from the subject fingerprint image 518 in substantially the same manner as has been described above.

Step 650

The processing apparatus 520 determines whether any of the records 28 in the search space comprises a match field 206 containing a match code that matches the subject match code. If the answer is YES, the next step is step 660; if the answer is NO, the next step is step 670.

Step 660

The processing apparatus 520 concludes that the subject has been successfully identified. Specifically, the identity of the subject is deemed to be the identity stored in the identifier field of the record for which the content of the match field matches the subject match code. In the unlikely event that there are two or more records meeting this condition, then a "hit list" may be issued for a subsequent level of matching using templates or images corresponding to one or more records, possibly including the involvement of a human to effect a manual decision on the members of the hit list.

Step 670

Although no match has been found, it is possible that this is due to mis-orientation of the subject fingerprint image 518 relative to the way that the reference fingerprint image was oriented when the match code had been derived. To this end, the subject fingerprint image 518 can be re-oriented (either by software prompt or by asking the subject to re-orient his/her finger). A re-oriented version of the subject fingerprint image 518 is thus obtained, and step 650 is performed once again until the amount of re-orientation reaches a threshold. At this point, if a match still has not been reached, the processing apparatus 520 concludes that the subject cannot be identified at present. In other words, the identity of the subject is unknown, and action can be taken depending on the application at hand, such as denial of access or a request for further credentials.

It should be appreciated that the execution of step 670 may require significant software resources and therefore it is advantageous if the number of comparisons performed subsequent to successive re-orientations is kept low. One effect of using the index code is therefore to narrow down the search space and avoid the execution of unnecessary comparisons.

Figure 7:
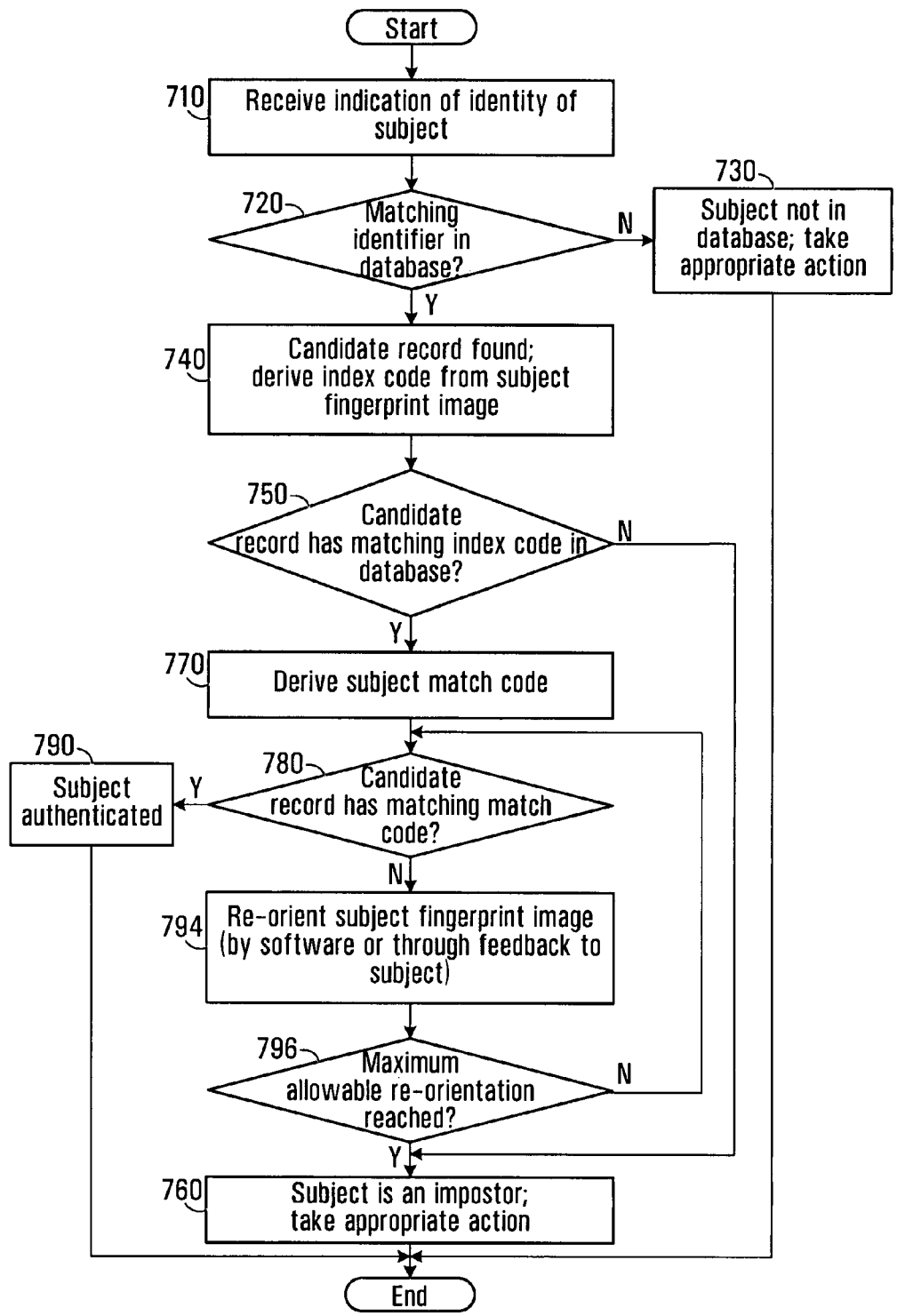
FIG. 7 is a flowchart showing steps in an authentication process in accordance with a specific non-limiting embodiment of the present invention.

In a second implementation, the processing apparatus 520 comprises suitable circuitry, software, firmware and/or control logic for executing an authentication process, which does not exclude the possibility of the processing apparatus 520 executing both the authentication process and the previously described identification process. By executing the authentication process, the processing apparatus 520 attempts to confirm whether the purported identity of the subject is indeed his or her identity. This is achieved in accordance with the following steps, described with reference to FIG. 7.

Step 710

The processing apparatus 520, receives an indication of the identity of the subject.

Step 720

The processing apparatus 520 consults the database 26 to determine whether any of the records 28 has an identifier field 202 whose contents match the purported identity of the subject. If the answer is NO, the next step is step 730; if the answer is YES, the next step is step 740.

Step 730

The processing apparatus 520 concludes that the subject is not represented in the database 26. This does not necessarily mean that the subject is an impostor, but instead signifies that the database 26 does not have a record corresponding to the purported identity of the subject. At this stage, action may be taken depending on the application, such as a request for additional credentials or denial of access as a default measure. Alternatively, the identification process described above with reference to FIG. 6 can be executed in an attempt to establish the identity of the subject, assuming that a reference fingerprint image has been previously obtained from the subject and stored in the database 26.

Step 740

The processing apparatus 520 concludes that there is a record having an identifier field 210 whose contents match the purported identity of the subject. This can be referred to as a candidate record. The processing apparatus 520 derives a subject index code from the subject fingerprint image 518 in substantially the same manner as has been described above.

Step 750

The processing apparatus 520 determines whether the subject index code matches the contents of the index field 204 of the candidate record. If the answer is NO, the next step is step 760; if the answer is YES, the next step is step 770.

Specifically, in this step, the condition that one index code "match" the other does not require that the index codes be identical, although if they are, a match will certainly be declared. Rather, a NO conclusion is reached under a "no match" condition, and a YES conclusion is reached otherwise. For instance, due to the underlying relative stability of the compound minutiae in a given fingerprint image, it is expected that the match codes derived from two fingerprint images originating from the same finger will indeed exhibit the same number of cores, the same number of deltas and the same number of other compound minutiae (i.e., thereby setting the total number of sectors). Therefore, portions of the index code specific to the core and delta should be identical; if they are not, a "no match" condition is reached and the outcome of step 750 is NO; otherwise, the outcome can be YES or a more stringent criterion may be considered. An example of a more stringent criterion is that the number of sectors should be identical; if they are not, a "no match" condition is reached and the outcome of step 750 is NO; otherwise, the outcome can be YES or an even more stringent criterion may be considered. An even more stringent criterion can be based on the fundamental minutiae. For instance, although their number and percentage may fluctuate, one nevertheless expects that the sectors containing the most and least numbers of fundamental minutiae will occur in the same positions in the two index codes being compared. This can be extended to a rank ordering of the positions of the sectors, based on minutiae load (e.g., number of fundamental minutiae, or relative number, share or percentage of total fundamental minutiae). Still other methodologies and criteria for striking the appropriate threshold for concluding that there is a "no match" condition are possible without departing from the scope of the present invention.

Step 760

The processing apparatus 520 concludes that the subject is an impostor. This is because, at a minimum, the subject index code should have matched the contents of the index field 202 of the candidate record, if the subject is genuine, i.e., the subject is who he/she says he/she is. Action can be taken depending on the application, such as denial of access and/or transmittal of a message to the authorities. Alternatively, for greater certainty, a template vector can be derived from the subject fingerprint image 518 and compared to the template vector for the candidate record (or the two raw data images can be compared), which will confirm the "no match" condition, thereby to validate the preliminary conclusion, namely that the subject is an impostor. Still, alternatively, the identification process described above with reference to FIG. 6 can be executed in an attempt to establish the true identity of the impostor, assuming that a reference fingerprint image has been previously obtained from the subject and stored in the database 26.

Step 770

The processing apparatus 520 derives a subject match code from the subject fingerprint image 518 in substantially the same manner as has been described above.

Step 780

The processing apparatus 520 determines whether the contents of the match field 206 of the candidate record matches the subject match code. If the answer is YES, the next step is step 790; if the answer is NO, the next step is step 794.

Step 790

The processing apparatus 520 concludes that the subject has been successfully authenticated, i.e., the purported identity of the subject has been confirmed as being the actual identity of the subject.

Step 794

Although no match has been found, it is possible that this is due to mis-orientation of the subject fingerprint image 518 relative to the way that the reference fingerprint image was oriented when the match code had been derived. To this end, the subject fingerprint image 518 can be re-oriented (either by software prompt or by asking the subject to re-orient his/her finger). A re-oriented version of the subject fingerprint image 518 is thus obtained, and step 780 is performed once again until the amount of re-orientation reaches a threshold (see Step 796). At this point, if a match still has not been reached, the processing apparatus 520 concludes that the subject is an impostor in a manner similar to that described in step 760. Action can be taken depending on the application, such as denial of access and/or transmittal of a message to the authorities.

It should be appreciated that although the above description has focused on fingerprint image processing for a single finger, it is nevertheless within the scope of the present invention to jointly process fingerprint images for multiple fingers, where available, in order to achieve even greater accuracy.

While specific embodiments of the present invention have been described and illustrated, it will be apparent to those skilled in the art that numerous modifications and variations can be made without departing from the scope of the invention as defined in the appended claims.

The invention claimed is:

1. An image acquisition system, comprising:
    a dark field image acquisition device for producing a first output representative of a fingerprint derived from a finger;
    a bright field image acquisition device, different from the dark field image acquisition device, the bright field image acquisition device for producing a second output representative of a contour of the finger;
    a processing entity configured to combine the first and second outputs to create a composite image of the finger.

2. The image acquisition system defined in claim 1, further comprising a transparent surface on which the finger is placed.

3. The image acquisition system defined in claim 2, further comprising a light source for shining light from underneath the surface at an angle to the surface.

4. The image acquisition system defined in claim 3, wherein the dark field image acquisition device is positioned so as to capture light reflected by valleys of the finger and refracted by the surface.

5. The image acquisition system defined in claim 4, wherein the dark field image acquisition device is located underneath the surface.

6. The image acquisition system defined in claim 5, wherein the first output is representative of a ridge/valley pattern of cart of the finger.

7. The image acquisition system defined in claim 6, wherein the composite image comprises the contour and the ridge/valley pattern.

8. The image acquisition system defined in claim 7, wherein the bright field image acquisition device comprises a camera.

9. The image acquisition system defined in claim 7, wherein the bright field image acquisition device comprises a 3-D profiler.

* * * * *